United States Patent
Hanks et al.

(10) Patent No.: US 9,688,925 B2
(45) Date of Patent: Jun. 27, 2017

(54) SYSTEM AND METHODS OF TRIM DEWAXING DISTILLATE FUELS

(71) Applicants: Patrick Loring Hanks, Bridgewater, NJ (US); William Ernest Lewis, Baton Rouge, LA (US)

(72) Inventors: Patrick Loring Hanks, Bridgewater, NJ (US); William Ernest Lewis, Baton Rouge, LA (US)

(73) Assignee: EXXONMOBIL RESEARCH AND ENGINEERING COMPANY, Annadale, NJ (US)

( * ) Notice: Subject to any disclaimer, the term of this patent is extended or adjusted under 35 U.S.C. 154(b) by 171 days.

(21) Appl. No.: 14/692,206

(22) Filed: Apr. 21, 2015

(65) Prior Publication Data

US 2015/0315495 A1    Nov. 5, 2015

Related U.S. Application Data

(60) Provisional application No. 61/986,929, filed on May 1, 2014.

(51) Int. Cl.
*C10G 69/02*    (2006.01)
*C10G 69/04*    (2006.01)
(Continued)

(52) U.S. Cl.
CPC ............ *C10G 69/02* (2013.01); *B01J 19/245* (2013.01); *C10G 15/08* (2013.01); *C10G 31/06* (2013.01);
(Continued)

(58) Field of Classification Search
CPC .... B01J 19/008; B01J 19/245; B01J 2219/24; C01B 3/02; C10G 15/08; C10G 2300/302; C10G 2300/4012; C10G 31/06; C10G 51/00; C10G 51/02; C10G 51/06; C10G 53/06; C10G 55/00; C10G 55/02; C10G 55/08; C10G 57/00; C10G 67/00;
(Continued)

(56) References Cited

U.S. PATENT DOCUMENTS

| | | |
|---|---|---|
| 4,481,101 A | 11/1984 | Yan |
| 5,492,654 A | 2/1996 | Kozjuk et al. |

(Continued)

FOREIGN PATENT DOCUMENTS

| | | |
|---|---|---|
| CN | 101475832 B | 6/2003 |
| CN | 101591561 B | 6/2012 |

(Continued)

OTHER PUBLICATIONS

Perry's Chemical Engineers Handbook, 8th Ed., 2008, McGraw Hill, p. 19-1-19-13.*

(Continued)

*Primary Examiner* — Renee Robinson
*Assistant Examiner* — Derek Mueller
(74) *Attorney, Agent, or Firm* — Chad A. Guice; Kristina M. Leavitt

(57) ABSTRACT

Systems and methods are provided for dewaxing a distillate fuel oil by subjecting an at least partially hydroprocessed distillate fuel oil to cavitation to reduce the pour point, reduce the cloud point, reduce the cold filter plugging point, or a combination thereof of the distillate fuel oil.

19 Claims, 2 Drawing Sheets

(51) Int. Cl.

| | | |
|---|---|---|
| *B01J 19/24* | (2006.01) | |
| *B01J 8/04* | (2006.01) | |
| *C10G 69/06* | (2006.01) | |
| *C10G 31/06* | (2006.01) | |
| *C10G 51/02* | (2006.01) | |
| *C10G 53/04* | (2006.01) | |
| *C10G 55/02* | (2006.01) | |
| *C10G 55/04* | (2006.01) | |
| *C10G 55/06* | (2006.01) | |
| *C10G 67/02* | (2006.01) | |
| *C10G 15/08* | (2006.01) | |

(52) U.S. Cl.
CPC ............. *C10G 51/02* (2013.01); *C10G 53/04* (2013.01); *C10G 55/02* (2013.01); *C10G 55/04* (2013.01); *C10G 55/06* (2013.01); *C10G 67/02* (2013.01); *C10G 69/04* (2013.01); *C10G 69/06* (2013.01); *B01J 2219/24* (2013.01); *C10G 2300/304* (2013.01); *C10G 2300/4012* (2013.01)

(58) Field of Classification Search
CPC ........ C10G 69/00; C10G 69/02; C10G 69/06; C10G 9/36
See application file for complete search history.

(56) References Cited

U.S. PATENT DOCUMENTS

| | | |
|---|---|---|
| 5,717,181 A | 2/1998 | Colgate |
| 6,979,757 B2 | 12/2005 | Powers |
| 2003/0102255 A1 | 6/2003 | Mahajan |
| 2005/0010075 A1 | 1/2005 | Powers |
| 2005/0261536 A1 | 11/2005 | Stell et al. |
| 2006/0231462 A1 | 10/2006 | Johnson |
| 2006/0283776 A1 | 12/2006 | Iqbal et al. |
| 2008/0217211 A1 | 9/2008 | Chornet et al. |
| 2010/0101978 A1 | 4/2010 | Gordon et al. |
| 2010/0122933 A1 | 5/2010 | Khan |
| 2011/0036751 A1 | 2/2011 | Stein et al. |
| 2011/0162999 A1 | 7/2011 | Lourenco et al. |
| 2011/0163000 A1 | 7/2011 | Lourenco et al. |
| 2011/0163004 A1 | 7/2011 | Lourenco et al. |
| 2011/0240517 A1 | 10/2011 | Chornet et al. |
| 2012/0004479 A1 | 1/2012 | Hanks et al. |
| 2012/0181216 A1 | 7/2012 | Kozyuk et al. |
| 2013/0062249 A1 | 3/2013 | Kozyuk et al. |
| 2013/0096354 A1 | 4/2013 | Chornet et al. |

FOREIGN PATENT DOCUMENTS

| | | |
|---|---|---|
| CN | 102899076 A | 1/2013 |
| CN | 101475832 B | 6/2013 |
| DE | 202011103295 U1 | 10/2011 |
| EP | 1452576 A2 | 1/2004 |
| EP | 1452576 A2 | 9/2004 |
| FR | 2929287 A1 | 10/2009 |
| RU | 2319729 C2 | 3/2008 |
| WO | 02102937 A | 12/2002 |
| WO | WO02102937 A1 | 12/2002 |
| WO | 2014041435 A2 | 3/2014 |
| WO | WO2014041435 A2 | 3/2014 |

OTHER PUBLICATIONS

PCT Application No. PCT/US2015/026866, Communication from the International Searching Authority, International Search Report and Written Opinion, Forms PCT/ISA/220, PCT/ISA/210 and PCT/ISA/237, dated Jul. 6, 2015, 12 pages.
PCT Application No. PCT/US2015/026846, Communication from the International Searching Authority, International Search Report and Written Opinion, Forms PCT/ISA/220, PCT/ISA/210 and PCT/ISA/237, dated Jul. 6, 2015, 12 pages.
PCT Application No. PCT/US2015/026852, Communication from the International Searching Authority, International Search Report and Written Opinion, Forms PCT/ISA/220, PCT/ISA/210 and PCT/ISA/237, dated Jul. 1, 2015, 10 pages.
PCT Application No. PCT/US2015/026857, Communication from the International Searching Authority, International Search Report and Written Opinion, Forms PCT/ISA/220, PCT/ISA/210 and PCT/ISA/237, dated Jun. 29, 2015, 11 pages.
PCT Application No. PCT/US2015/026890, Communication from the International Searching Authority, International Search Report and Written Opinion, Forms PCT/ISA/220, PCT/ISA/210 and PCT/ISA/237, dated Jun. 5, 2015, 9 pages.
PCT Application No. PCT/US2015/026867, Communication from the International Searching Authority, International Search Report and Written Opinion, Forms PCT/ISA/220, PCT/ISA/210 and PCT/ISA/237, dated Jun. 24, 2015, 9 pages.
PCT Application No. PCT/US2015/026879, Communication from the International Searching Authority, International Search Report and Written Opinion, Forms PCT/ISA/220, PCT/ISA/210 and PCT/ISA/237, dated Jul. 28, 2015, 9 pages.
PCT Application No. PCT/US2015/026884, Communication from the International Searching Authority, International Search Report and Written Opinion, Forms PCT/ISA/220, PCT/ISA/210 and PCT/ISA/237, dated Jun. 24, 2015, 9 pages.
J.-R. Lin and T.F. Yen, "An Upgrading Process Through Cavitation and Surfactant", Energy & Fuels, vol. 7, 2002, pp. 111-118.
M. Subramanian, M.D. Deo and F.V. Hanson, "Compositional Analysis of Bitumen and Bitumen-Derived Products", Journal of Chromatographic Science, vol. 34, No. 1, 1996, pp. 20-26.
The International Search Report and Written Opinion of PCT/US2015/026866 dated Jul. 6, 2015.
The International Search Report and Written Opinion of PCT/US2015/026846 dated Jul. 6, 2015.
The International Search Report and Written Opinion of PCT/US2015/026886 dated Sep. 4, 2015.
The International Search Report and Written Opinion of PCT/US2015/026852 dated Jul. 1, 2015.
The International Search Report and Written Opinion of PCT/US2015/026857 dated Jun. 29, 2015.
The International Search Report and Written Opinion of PCT/US2015/026890 dated Jun. 5, 2015.
The International Search Report and Written Opinion of PCT/US2015/026867 dated Jun. 24, 2015.
The International Search Report and Written Opinion of PCT/US2015/026879 dated Jul. 28, 2015.
The International Search Report and Written Opinion of PCT/US2015/026884 dated Jun. 24, 2015.
The International Search Report and Written Opinion of PCT/US2015/026882 dated Dec. 16, 2015.
U.S. Appl. No. 14/691,849.
U.S. Appl. No. 14/691,871.
U.S. Appl. No. 14/691,931.
U.S. Appl. No. 14/691,980.
U.S. Appl. No. 14/691,998.
U.S. Appl. No. 14/692,069.
U.S. Appl. No. 14/692,247.
U.S. Appl. No. 14/692,206.

\* cited by examiner

SYSTEM AND METHODS OF TRIM DEWAXING DISTILLATE FUELS

CROSS-REFERENCE TO RELATED APPLICATION

The present application claims priority to U.S. patent application Ser. No. 61/986,929, filed May 1, 2014.

FIELD

The present invention relates to systems and methods of trim dewaxing distillate fuels. More specifically, the present invention relates to systems and methods of trim dewaxing distillate fuels using hydrodynamic cavitation to improve cloud point, pour point, or cold filter plugging point properties of the fuel.

BACKGROUND

A concern for future diesel fuels is the ability to produce higher quality and cleaner burning diesel fuels without extensive and expensive reprocessing. Cold flow properties of diesel oils, sometimes measured by the oil's cloud point, pour point, or cold filter plugging point, are aspects of fuel quality that may require seasonal adjustment. Traditionally, this issue is resolved through dewaxing, cracking, blend additives, or cutting the heavy tail out of the feed. Dewaxing may require substantial investment in an additional hydrotreating reactor or require addition of dewaxing catalyst in the hydrotreater bed, which sacrifices hydrotreating catalyst capacity of the hydrotreater.

There therefore remains a need for new methods and systems to efficiently dewax distillate feeds on a permanent or a seasonal basis.

SUMMARY

The present invention addresses these and other problems by providing systems and methods for dewaxing a distillate fuel oil by subjecting an at least partially hydroprocessed distillate fuel oil to cavitation to reduce the pour point, reduce the cloud point, reduce the cold filter plugging point, or a combination thereof of the distillate fuel oil.

In one aspect, a method is provided for dewaxing a distillate fuel oil. The method includes hydroprocessing a stream of a distillate fuel oil in a reactor to produce a distillate fuel oil that is at least partially hydroprocessed; and feeding at least a portion of the distillate fuel oil that has been at least partially hydroprocessed to a cavitation unit wherein the portion of the distillate fuel oil is subjected to cavitation to reduce the pour point, reduce the cloud point, reduce the cold filter plugging point, or a combination thereof of the portion of the distillate fuel oil.

In another aspect, a system is provided for dewaxing a distillate fuel oil. The system includes a distillate fuel oil stream; a hydroprocessing unit receiving the distillate fuel stream and adapted to at least partially hydroprocess the distillate fuel stream and thereby produce a processed stream; and a hydrodynamic cavitation unit downstream of the hydroprocessing unit and adapted to receive at least a portion of the processed stream and subject the processed stream to hydrodynamic cavitation to reduce the pour point, reduce the cloud point, reduce the cold filter plugging point, or a combination thereof of the portion of the processed stream,

DETAILED DESCRIPTION

Methods and systems are provided for trim dewaxing distillate fuel oils using cavitation, such as hydrodynamic cavitation. Such methods and systems are particularly useful for improving the cold flow properties of diesel fuels, such as in lowering the cloud point, pour point, and cold filter plugging point of the fuel. Cloud point may be measured by ASTM D2500. Pour point may be measured by ASTM D5985. Cold filter plugging point may be measured by ASTM D6371.

The term "cavitation" as used herein refers to a process whereby a force is exerted on a fluid to cause the successive rapid formation and collapse of vapor bubbles within the fluid. The force may be a sudden increase and decrease of pressure or applied hydrodynamic force, a resonant force applied by an acoustic or electromagnetic field, or other.

Methods for dewaxing a distillate fuel oil are described herein that include hydroprocessing a stream of a distillate fuel oil in a reactor to produce a distillate fuel oil that is at least partially hydroprocessed; and feeding at least a portion of the distillate fuel oil that has been at least partially hydroprocessed to a cavitation unit wherein the portion of the distillate fuel oil is subjected to cavitation to reduce the pour point, reduce the cloud point, reduce the cold filter plugging point, or a combination thereof of the portion of the distillate fuel oil.

As used herein the term "distillate fuel oils" refers to petroleum fractions heavier than gasoline and naphtha used for diesel and other fuel oils including, but not limited to, No. 1, No. 2, and No. 4 diesel fuel, and No. 1, No. 2, and No. 4 fuel oils.

Suitable feeds for the systems and methods disclosed herein include those with a T95 (the temperature at which most all the material has boiled off, leaving only 5 wt % remaining in the distillation pot at atmospheric pressure) of at least 600° F., more preferably between 600° F. and 780° F. Generally, however, the methods and systems disclosed herein may be most useful for feeds having a T95 of 630° F. or greater, particularly between 630° F. and 780° F., where cloud point and pour point improvement is often desired. The feeds may also have a T5 (the temperature at which 5 wt % of the material in the feed boils off) of 300° F. or more.

Figure 2:
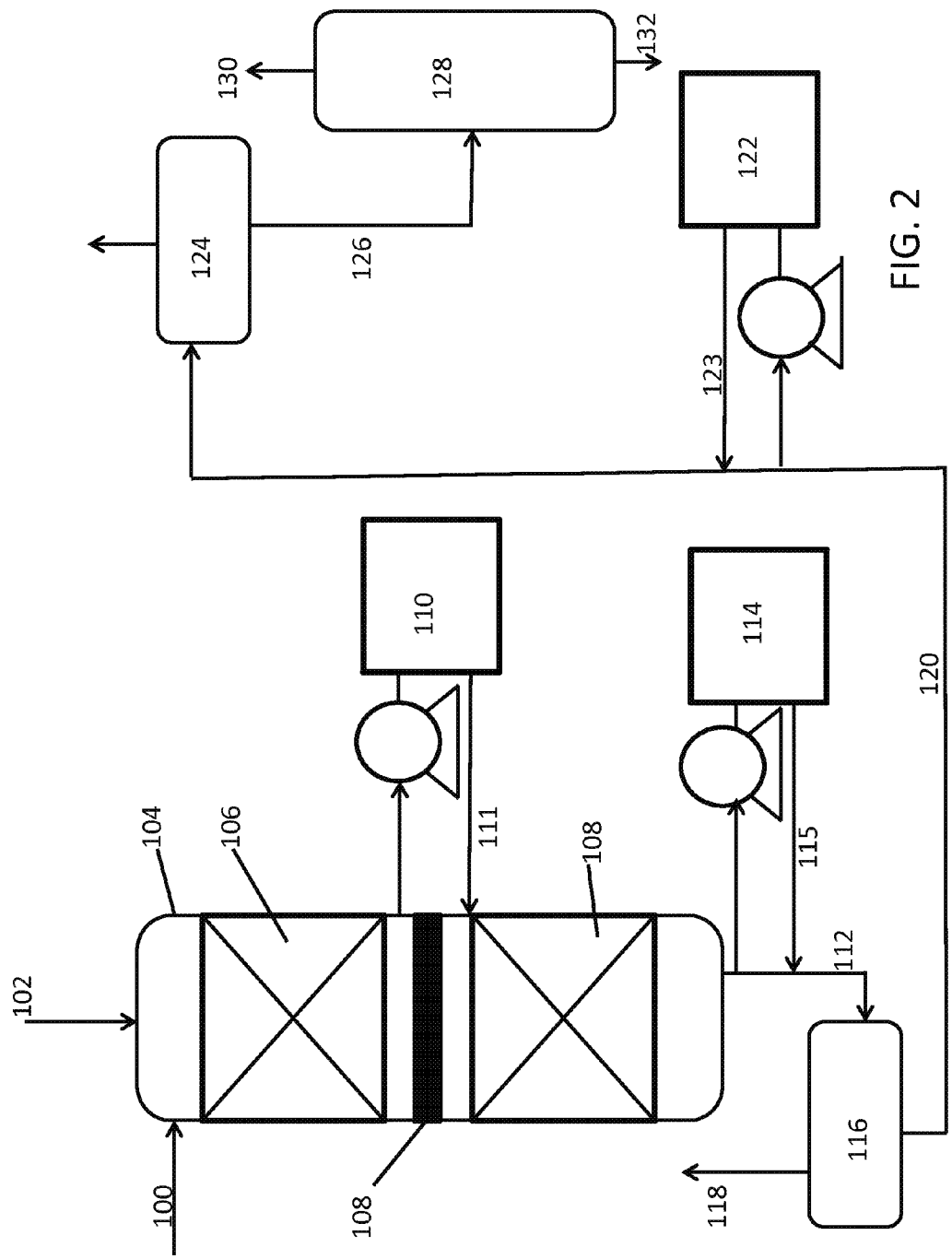
FIG. 2 is a flow diagram of a system for trim dewaxing distillate fuels, according to one or more embodiments of the present invention.

In an exemplary embodiment, as illustrated in FIG. 2, a distillate fuel oil feed 100 is fed to a hydroprocessing unit 104 with a hydrogen gas feed 102. The hydroprocessing unit 104 removes heteroatoms from the distillate fuel oil and adjusts the hydrogen to carbon ratio of feed 100 utilizing a first hydroprocessing zone 106 and a second hydroprocessing zone 108, each comprising a catalyst bed. Heteroatom is defined herein as atoms other than carbon and hydrogen, such as but not limited to: sulfur, nitrogen, oxygen, silica, arsenic, nickel, vanadium, phosphorous, iron, sodium, and potassium. Various catalysts may be employed in the catalyst beds to remove sulfur from the distillate fuel oil including but not limited to molybdenum-based catalysts, such as nickel-molybdenum, cobalt-molybdenum, or combinations thereof. A redistribution tray 108 is provided between the first hydroprocessing zone 106 and the second hydroprocessing zone 108 for catching the liquid distillate that passes through the first hydroprocessing zone 108 and to allow for more even distribution of the distillate into and through the second hydroprocessing zone. Although not shown in FIG. 2, additional hydrogen has may be injected into the hydroprocessing unit 104 below the distributor tray 108. While FIG. 2 displays a two zone hydroprocessing unit, the invention is not limited in application to only two zones, and a given hydroprocessing unit may have 3, 4, 5, or more hydroprocessing zones in series or in parallel.

The hydroprocessed distillate 112 is then fed to a high pressure separator 116, where predominantly hydrogen gas is recovered to recycle stream 118. The liquid stream 120 from the high pressure separator 116 is fed to a low pressure separator 124 where additional hydrogen gas and $H_2S$ is recovered. The liquid stream 126 from low pressure separator 124 is then fed to a product separator 128, where light ends, dissolved gases, and naphtha 130 are separated from the distillate fuel oil product 132. "Light ends" as used herein means molecules with four or fewer carbon atoms. "Dissolved gases" are defined to include any gases solubilized in the hydrocarbon product that may include, but is not limited to: hydrogen, hydrogen sulfide, ammonia, carbon dioxide, and carbon monoxide. Naphtha is defined as a hydrocarbon material having a T5 of 80° F. or greater and a T95 up to 380° F.

During operation of the foregoing process, trim dewaxing capability is provided by one or more hydrodynamic cavitation units 110, 114, 122. These units may be employed seasonally, year-around, or when trim dewaxing, e.g., decreased cloud point, cold filter plugging point, or pour point, is required or desired for the distillate fuel oil product 132. Three locations for the deployment of such cavitation units are illustrated in FIG. 2, but it should be appreciated that any single unit or any combination of units may be employed according to one or more embodiments of the present invention. Aspects and operation of the cavitation units 110, 114, 122 are described in greater detail subsequently herein. As illustrated in FIG. 2, the cavitation devices are represented by hydrodynamic cavitation units, but it is recognized one skilled in the art may substitute other cavitation devices such as, but not limited to: acoustic cavitation units employing sonic horns or rotor-stator cavitation units.

In a first position, liquid from the distributor tray 108 is pump-fed to hydrodynamic cavitation unit 110 where it is subjected to hydrodynamic cavitation. The cavitated liquid distillate 111 can then be reinjected at reactor pressure into the second hydroprocessing zone 108 for further treatment. The distillate optionally can be cooled or quenched before it is reinjected into the hydroprocessing unit 104. Advantageously, any olefins produced by cracking the longer chain paraffins may be saturated in the second hydroprocessing zone 108, avoiding or mitigating any loss in cetane. Cetane can be measured by ASTM D613.

In a second position, the hydroprocessed distillate stream 112 leaving the hydroprocessing unit 104 can be fed to a hydrodynamic cavitation unit 114. After being subjected to hydrodynamic cavitation, the cavitated hydroprocessed distillate stream 115 is fed to the high pressure separator 116. In a third position, the liquid stream 120 from the high pressure separator 112 may be fed to a hydrodynamic cavitation unit 122. After being subjected to hydrodynamic cavitation, the cavitated stream is fed to the low pressure separator 124. Although a pump is illustrated upstream of the hydrodynamic cavitation unit 122, it may not be required if the pressure difference is sufficient between the high pressure separator and low pressure separator.

In most applications, utilizing a single one of cavitation units 110, 114, 122 may be sufficient to achieve the desired level of dewaxing. Because of the possibility of saturating olefins produced by the cracking of paraffins, the use of hydrodynamic cavitation unit 110 between the two desulfurization zones 106, 108 is generally preferred. However, the deployment of cavitation units 114 and 122 downstream of the hydroprocessing unit 104 may be more practical in certain refineries. Placement upstream of the high pressure separator 116 is advantageous because the dissolved hydrogen gas present in the hydroprocessed distillate stream 115 facilitates radical capping and saturation of produced olefins. The placement of the cavitation unit 122 between the high pressure separator 116 and the low pressure separator 124 may be preferred in other refineries; however, particularly where the pressure differential between the high pressure separator 116 and low pressure separator 124 renders a pump feeding the cavitation unit 122 unnecessary. Still, in other applications, it may be desired to have multiple cavitation units installed and different individual units or combination units activated (such as by regulation of control valves) as desired by the circumstances.

Hydrodynamic Cavitation Unit

The term "hydrodynamic cavitation", as used herein refers to a process whereby fluid undergoes convective acceleration, followed by pressure drop and bubble formation, and then convective deceleration and bubble implosion. The implosion occurs faster than most of the mass in the vapor bubble can transfer to the surrounding liquid, resulting in a near adiabatic collapse. This generates extremely high localized energy densities (temperature, pressure) capable of dealkylation of side chains from large hydrocarbon molecules, creating free radicals and other sonochemical reactions.

Figure 1:
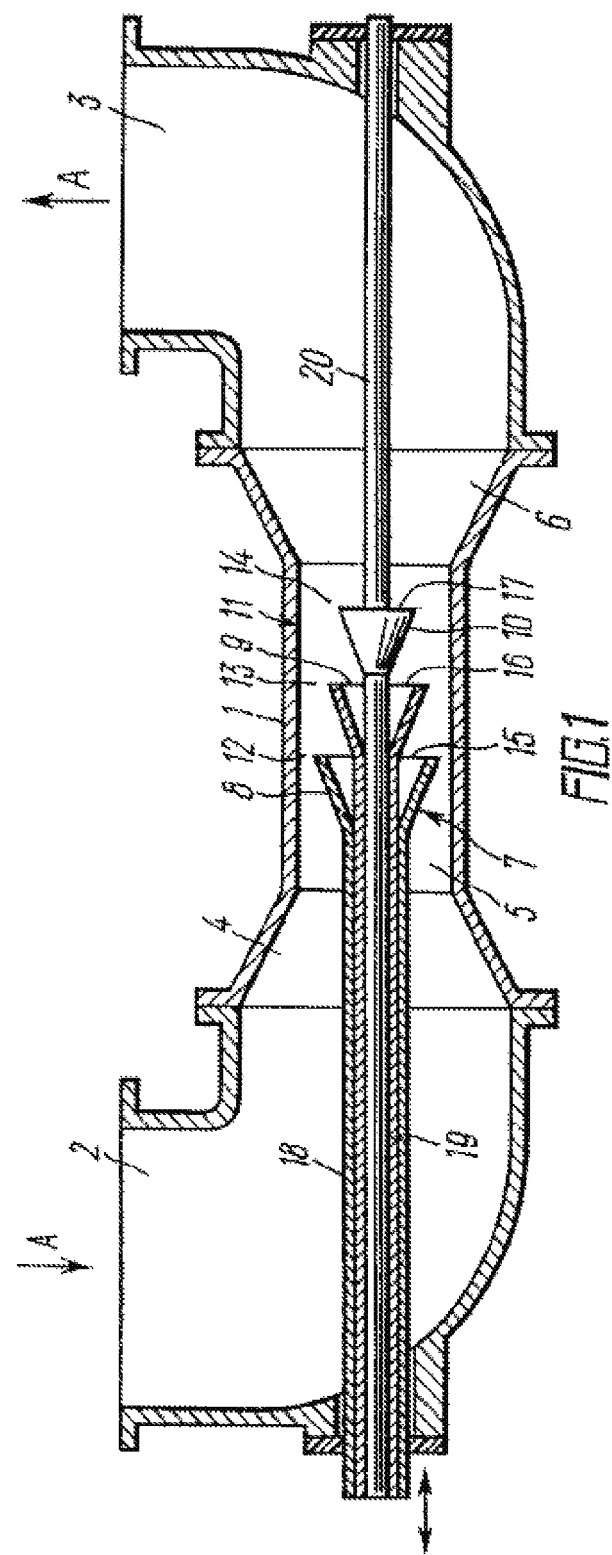
FIG. 1 is a cross section view of an exemplary hydrodynamic cavitation unit, which may be employed in one or more embodiments of the present invention.

The term "hydrodynamic cavitation unit" refers to one or more processing units that receive a fluid and subject the fluid to hydrodynamic cavitation. In any embodiment, the hydrodynamic cavitation unit may receive a continuous flow of the fluid and subject the flow to continuous cavitation within a cavitation region of the unit. An exemplary hydrodynamic cavitation unit is illustrated in FIG. 1. Referring to FIG. 1, there is a diagrammatically shown view of a device consisting of a housing I having inlet opening 2 and outlet opening 3, and internally accommodating a contractor 4, a flow channel 5 and a diffuser 6 which are arranged in succession on the side of the opening 2 and are connected with one another. A cavitation region defined at least in part by channel 5 accommodates a baffle body 7 comprising three elements in the form of hollow truncated cones 8, 9, 10 arranged in succession in the direction of the flow and their smaller bases are oriented toward the contractor 4. The baffle body 7 and a wall 11 of the flow channel 5 form sections 12, 13, 14 of the local contraction of the flow arranged in succession in the direction of the flow and shaving the cross-section of an annular profile. The cone 8, being the first in the direction of the flow, has the diameter of a larger base 15 which exceeds the diameter of a larger base 16 of the subsequent cone 9. The diameter of the larger base 16 of the cone 9 exceeds the diameter of a larger base 17 of the subsequent cone 10. The taper angle of the cones 8, 9, 10 decreases from each preceding cone to each subsequent cone.

The cones may be made specifically with equal taper angles in an alternative embodiment of the device. The cones 8, 9, 10 are secured respectively on rods 18, 19, 20 coaxially installed in the flow channel 5. The rods 18, 19 are made hollow and are arranged coaxially with each other, and the rod 20 is accommodated in the space of the rod 19 along the axis. The rods 19 and 20 are connected with individual mechanisms (not shown in FIG. 1) for axial movement relative to each other and to the rod 18. In an alternative embodiment of the device, the rod 18 may also be provided with a mechanism for movement along the axis of the flow channel 5. Axial movement of the cones 8, 9, 10 makes it possible to change the geometry of the baffle body 7 and hence to change the profile of the cross-section of the sections 12, 13, 14 and the distance between them throughout the length of the flow channel 5 which in turn makes it possible to regulate the degree of cavitation of the hydrodynamic cavitation fields downstream of each of the cones 8, 9, 10 and the multiplicity of treating the components. For adjusting the cavitation fields, the subsequent cones 9, 10 may be advantageously partly arranged in the space of the preceding cones 8, 9; however, the minimum distance between their smaller bases should be at least equal to 0.3 of the larger diameter of the preceding cones 8, 9, respectively. If required, one of the subsequent cones 9, 10 may be completely arranged in the space of the preceding cone on condition of maintaining two working elements in the baffle body 7. The flow of the fluid under treatment is show by the direction of arrow A.

Hydrodynamic cavitation units of other designs are known and may be employed in the context of the inventive systems and processes disclosed herein. For example, hydrodynamic cavitation units having other geometric profiles are illustrated and described in U.S. Pat. No. 5,492,654, which is incorporated by reference herein in its entirety. Other designs of hydrodynamic cavitation units are described in the published literature, including but not limited to U.S. Pat. Nos. 5,937,906; 5,969,207; 6,502,979; 7,086,777; and 7,357,566, all of which are incorporated by reference herein in their entirety.

In an exemplary embodiment, conversion of hydrocarbon fluid is achieved by establishing a hydrodynamic flow of the hydrodynamic fluid through a flow-through passage having a portion that ensures the local constriction for the hydrodynamic flow, and by establishing a hydrodynamic cavitation field (e.g., within a cavitation region of the cavitation unit) of collapsing vapor bubbles in the hydrodynamic field that facilitates the conversion of at least a part of the hydrocarbon components of the hydrocarbon fluid.

For example, a hydrocarbon fluid may be fed to a flow-through passage at a first velocity, and may be accelerated through a continuous flow-through passage (such as due to constriction or taper of the passage) to a second velocity that may be 3 to 50 times faster than the first velocity. As a result, in this location the static pressure in the flow decreases, for example from 1-20 kPa. This induces the origin of cavitation in the flow to have the appearance of vapor-filled cavities and bubbles. In the flow-through passage, the pressure of the vapor hydrocarbons inside the cavitation bubbles is 1-20 kPa. When the cavitation bubbles are carried away in the flow beyond the boundary of the narrowed flow-through passage, the pressure in the fluid increases.

This increase in the static pressure drives the near instantaneous adiabatic collapsing of the cavitation bubbles. For example, the bubble collapse time duration may be on the magnitude of $10^{-6}$ to $10^{-8}$ second. The precise duration of the collapse is dependent upon the size of the bubbles and the static pressure of the flow. The flow velocities reached during the collapse of the vacuum may be 100-1000 times faster than the first velocity or 6-100 times faster than the second velocity. In this final stage of bubble collapse, the elevated temperatures in the bubbles are realized with a rate of change of $10^{10}$-$10^{12}$ K/sec. The vaporous/gaseous mixture of hydrocarbons found inside the bubbles may reach temperatures in the range of 1500-15,000K at a pressure of 100-1500 MPa. Under these physical conditions inside of the cavitation bubbles, thermal disintegration of hydrocarbon molecules occurs, such that the pressure and the temperature in the bubbles surpasses the magnitude of the analogous parameters of other cracking processes. In addition to the high temperatures formed in the vapor bubble, a thin liquid film surrounding the bubbles is subjected to high temperatures where additional chemistry (ie, thermal cracking of hydrocarbons and dealkylation of side chains) occurs. The rapid velocities achieved during the implosion generate a shockwave that can: mechanically disrupt agglomerates (such as asphaltene agglomerates or agglomerated particulates), create emulsions with small mean droplet diameters, and reduce mean particulate size in a slurry.

In any embodiment, hydrodynamic cavitation of the distillate fuel oil may be performed at a temperature of 300-750° F. (149-399° C.) and 600-2500 psig (4.14-17.24 MPag). In any embodiment, the distillate fuel oil may be subjected to a pressure drop of at least 400 psig, or more preferably greater than 1000 psig, or even more preferably greater than 2000 psig when subjected to hydrodynamic cavitation.

SPECIFIC EMBODIMENTS

In order to illustrate various aspects of the present invention, the following embodiments are provided:

Paragraph A—A method of dewaxing a distillate fuel oil comprising: hydroprocessing a stream of a distillate fuel oil in a reactor to produce a distillate fuel oil that is at least partially hydroprocessed; and feeding at least a portion of the distillate fuel oil that has been at least partially hydroprocessed to a cavitation unit wherein the portion of the distillate fuel oil is subjected to cavitation to reduce the pour point, reduce the cloud point, reduce the cold filter plugging point, or a combination thereof of the portion of the distillate fuel oil.

Paragraph B—The method of Paragraph A, wherein the cavitation unit is a hydrodynamic cavitation unit, and wherein the hydrodynamic cavitation unit subjects the at least a portion of the distillate fuel to hydrodynamic cavitation to convert at least a portion of the hydrocarbons present in the at least a portion of distillate fuel by isomerization or cracking.

Paragraph C—The method of Paragraph A or B, wherein the distillate fuel oil has a T95 of at least 630° F.

Paragraph D—The method of any of Paragraphs A-C, wherein the cavitation is performed at a severity to achieve a cloud point reduction of at least 1° C.

Paragraph E—The method of any of Paragraphs A-D, wherein the cavitation is performed at a severity to achieve a cloud point reduction of 1° C. to 10° C.

Paragraph F—The method of Paragraph E, wherein the cavitation is performed at a severity to achieve a cloud point reduction of 1° C. to 5° C.

Paragraph G—The method of any of Paragraphs A-F, wherein the cavitation is performed at a severity to achieve a pour point reduction of at least 1° C.

Paragraph H—The method of any of Paragraphs A-G, wherein the cavitation is performed at a severity to achieve a pour point reduction of 1° C. to 10° C.

Paragraph I—The method of Paragraph H, wherein the cavitation is performed at a severity to achieve a pour point reduction of 1° C. to 5° C.

Paragraph J—The method of any of Paragraphs A-I, wherein the cavitation is performed at a severity to achieve a cold filter plugging point reduction of at least 1° C.

Paragraph K—The method of any of Paragraphs A-J, further comprising reinjecting the portion of the distillate fuel oil that is at least partially hydroprocessed into the reactor for additional hydroprocessing after the portion of the distillate fuel oil is subjected to cavitation.

Paragraph L—The method of any of Paragraphs A-K, wherein the portion of the distillate fuel oil stream fed to the cavitation unit is a side draw stream from the hydroprocessing reactor (e.g., a stream comprising some hydrocarbon material that has not passed entirely though all stages of the hydroprocessing reactor. For example, the stream may be a liquid stream taken from an initial or intermediate stage of the hydroprocessing reactor that is fed to the cavitation unit and then reinjected back into the hydroprocessing reactor at the same or different stage. For example, the method of any of Paragraphs A-K, wherein the reactor has an upstream (e.g., a first) hydroprocessing zone comprising a first catalyst bed and a subsequent hydroprocessing zone comprising a second catalyst bed; wherein the reactor comprises a distributor tray between the first hydroprocessing zone and the subsequent hydroprocessing zone; and wherein the portion of distillate fuel oil fed to the cavitation unit is collected from the distributor tray.

Paragraph M—The method of Paragraph L, further comprising reinjecting the portion of the distillate fuel oil that is at least partially hydroprocessed into the reactor into the subsequent hydroprocessing zone for additional hydroprocessing after the portion of the distillate fuel oil is subjected to cavitation.

Paragraph N—The method of any of Paragraphs A-M, further comprising feeding the portion of the distillate fuel oil that is at least partially hydroprocessed to a high pressure separator to recover hydrogen containing gas after subjecting the portion of the distillate fuel oil to cavitation.

Paragraph O—The method of any of Paragraphs A-N, further comprising feeding the portion of the distillate fuel oil that is at least partially hydroprocessed to a high pressure separator to recover hydrogen containing gas before subjecting the portion of the distillate fuel oil to cavitation.

Paragraph P—The method of any of Paragraphs A-O, wherein the cavitation is performed in the absence of a catalyst.

Paragraph Q—The method of any of Paragraphs A-P, further comprising upgrading the distillate fuel oil by distillation, extraction, hydroprocessing, hydrocracking, fluidized cat cracking, solvent dewaxing, delayed coking, fluid coking, partial oxidation, gasification, or a combination thereof.

Paragraph R—A system adapted to perform any of the methods of Paragraphs A-Q.

Paragraph S—A system for dewaxing a distillate fuel oil comprising: a distillate fuel oil stream; a hydroprocessing unit receiving the distillate fuel stream and adapted to at least partially hydroprocess the distillate fuel stream and thereby produce a processed stream; and a hydrodynamic cavitation unit downstream of the hydroprocessing unit and adapted to receive at least a portion of the processed stream and subject the processed stream to hydrodynamic cavitation to reduce the pour point, reduce the cloud point, reduce the cold filter plugging point, or a combination thereof of the portion of the processed stream.

Paragraph T—The method or system of any of paragraphs A-S, wherein the cavitation is performed in the absence of a distinct vapor phase present in the feed.

Paragraph U—The method or system of any of paragraphs A-T, wherein the feed to the hydrodynamic cavitation unit has an API gravity of 25 degrees or more.

EXAMPLE ONE

It may be predicted that hydrocarbon materials having T95 boiling points of 600° F. to 780° F., and/or API gravities of 28 to 34 may be cavitated to reduce cloud point, pour point, or cold filter plugging points. Without being bound by theory, it is believed that the cavitation of such distillate fuel oil streams will crack long chain paraffins present in the feed, and the long chain paraffins are believed to increase the cloud point and pour point of distillate fuel oils. Thus, it is expected that even a small degree of cracking induced by hydrodynamic cavitation would selectively favor these long chain paraffins and improve cold flow properties. For example, it is expected that cracking by hydrodynamic cavitation would reduce pour point of a distillate fuel oil by at least 1° C. and/or is reduce cloud point of a distillate fuel oil by 1° C. relative to a noncavitated sample of the same distillate fuel oil.

Furthermore, based on the level of cracking observed in the foregoing examples and the known cracking reactivity of long chain paraffins relative to other components in the distillate fuel oils, reductions in pour point in the range of 1° C. and 10° C. and/or reductions in cloud point in the range of 1° C. and 10° C. are expected to be achievable.

Thus, in any embodiment, the systems and methods may be employed to reduce the pour point of a distillate fuel oil by at least 1° C., or by at least 2° C., or by at least 3° C., or by at least 4° C., or by at least 5° C., or by at least 6° C., or by at least 7° C. or between 1° C. and 10° C., or between 2° C. and 10° C., or between 3° C. and 10° C. or between 4° C. and 10° C., or between 5° C. and 10° C., or between 6° C. and 10° C., or between 7° C. and 10° C., or between 1° C. and 5° C.

In any embodiment, the systems and methods may be employed to reduce the cloud point of a distillate fuel oil by at least 1° C. or by at least 2° C., or by at least 3° C. or by at least 4° C., or by at least 5° C. or by at least 6° C., or by at least 7° C., or between 1° C. and 10° C., or between 2° C. and 10° C., or between 3° C. and 10° C., or between 4° C. and 1° C., or between 5° C. and 10° C., or between 6° C. and 10° C., or between 7° C. and 10° C., or between 1° C. and 5° C.

Similarly, in any embodiment, the systems and methods may be employed to reduce the cold filter plugging point of a distillate fuel oil by at least 1° C., or by at least 2° C., or by at least 3° C., or by at least 4° C., or by at least 5° C., or by at least 6° C., or by at least 7° C. or between 1° C. and 10° C., or between 2° C. and 10° C., or between 3° C. and 10° C., or between 4° C. and 10° C., or between 5° C. and 10° C., or between 6° C. and 10° C., or between 7° C. and 10° C., or between 1° C. and 5° C.

In a prophetic example, a hydrocarbon containing stream having the properties shown in Table 1 (boiling points by ASTM D2887) may be fed to a hydrotreating unit. The hydrotreating unit may have two reactors in parallel, each containing 4 beds of catalyst. The catalyst may be of the nickel-molybdenum variety, such as those sold by Albemarle (KF-848), Criterion (DN-3330E, DN3630), and others. The hydrotreating unit's nominal operation conditions are 1200 psig, 1600 scf $H_2$ per barrel of feed, a liquid hourly space velocity of 1.0 hr$^{-1}$, and a weighted average bed temperature of 630 to 730° F. The product effluent stream from the hydrotreater has 15 wppm sulfur or less and a cloud point of −10° C.

TABLE 1

| API, ° | 28 |
|---|---|
| Sulfur, wt % | 1.1 |
| IBP, ° F. | 342 |
| T5, ° F. | 416 |
| T50, ° F. | 575 |
| T95, ° F. | 718 |
| FBP, ° F. | 778 |

The hydrotreater effluent may be cavitated at 400° F. across a device similar to the one described above. Pressure drop across the device may be approximately 2000 psig, with the downstream pressure being maintained at 50 psig. The cloud point of the cavitated hydrotreater effluent stream may be −12° C.

What is claimed is:

1. A method of dewaxing a distillate fuel oil comprising:
hydroprocessing a distillate fuel oil stream in a reactor to produce a distillate fuel oil stream that is at least partially hydroprocessed, wherein the reactor has an upstream hydroprocessing zone comprising a first catalyst bed, a subsequent hydroprocessing zone comprising a second catalyst bed, and a distributor tray between the upstream hydroprocessing zone and the subsequent hydroprocessing zone; and
feeding at least a portion of the distillate fuel oil stream that has been at least partially hydroprocessed to a cavitation unit wherein the portion of the distillate fuel oil stream is subjected to cavitation to reduce the pour point, reduce the cloud point, reduce the cold filter plugging point, or a combination thereof of the portion of the distillate fuel oil stream, and wherein the portion of distillate fuel oil stream fed to the cavitation unit is collected from the distributor tray.

2. The method of claim 1, wherein the cavitation unit is a hydrodynamic cavitation unit, and wherein the hydrodynamic cavitation unit subjects the at least a portion of the distillate fuel oil stream to hydrodynamic cavitation to convert at least a portion of the hydrocarbons present in the at least a portion of distillate fuel oil stream by isomerization or cracking.

3. The method of claim 1, wherein the distillate fuel oil stream has a T95 of at least 630° F.

4. The method of claim 1, wherein the cavitation is performed at a severity to achieve a cloud point reduction of at least 1° C.

5. The method of claim 1, wherein the cavitation is performed at a severity to achieve a cloud point reduction of 1° C. to 10° C.

6. The method of claim 5, wherein the cavitation is performed at a severity to achieve a cloud point reduction of 1° C. to 5° C.

7. The method of claim 1, wherein the cavitation is performed at a severity to achieve a pour point reduction of at least 1° C.

8. The method of claim 1, wherein the cavitation is performed at a severity to achieve a pour point reduction of 1° C. to 10° C.

9. The method of claim 8, wherein the cavitation is performed at a severity to achieve a pour point reduction of 1° C. to 5° C.

10. The method of claim 1, wherein the cavitation is performed at a severity to achieve a cold filter plugging point reduction of at least 1° C.

11. The method of claim 1, further comprising reinjecting the portion of the distillate fuel oil stream that is at least partially hydroprocessed into the reactor for additional hydroprocessing after the portion of the distillate fuel oil stream is subjected to cavitation.

12. The method of claim 1, further comprising reinjecting the portion of the distillate fuel oil stream that is at least partially hydroprocessed into the reactor into the subsequent hydroprocessing zone for additional hydroprocessing after the portion of the distillate fuel oil stream is subjected to cavitation.

13. The method of claim 1, further comprising feeding the portion of the distillate fuel oil stream that is at least partially hydroprocessed to a high pressure separator to recover a hydrogen containing gas after subjecting the portion of the distillate fuel oil stream to cavitation.

14. The method of claim 1, further comprising feeding the portion of the distillate fuel oil stream that is at least partially hydroprocessed to a high pressure separator to recover a hydrogen containing gas before subjecting the portion of the distillate fuel oil stream to cavitation.

15. The method of claim 1, wherein the cavitation is performed in the absence of a catalyst.

16. The method of claim 1, wherein the feed to the cavitation unit is devoid of a distinct vapor phase.

17. The method of claim 1, further comprising upgrading the distillate fuel oil stream by distillation, extraction, hydroprocessing, hydrocracking, fluidized cat cracking, solvent dewaxing, delayed coking, fluid coking, partial oxidation, gasification, or a combination thereof.

18. The method of claim 1, wherein the distillate fuel oil has an API gravity of 25 degrees or more.

19. A system for dewaxing a distillate fuel oil comprising:
a distillate fuel oil stream;
a hydroprocessing unit receiving the distillate fuel stream and adapted to at least partially hydroprocess the distillate fuel stream and thereby produce a processed stream, wherein the hydroprocessing unit has an upstream hydroprocessing zone comprising a first catalyst bed, a subsequent hydroprocessing zone comprising a second catalyst bed, and a distributor tray between the upstream hydroprocessing zone and the subsequent hydroprocessing zone; and
a hydrodynamic cavitation unit downstream of the hydroprocessing unit and adapted to receive at least a portion of the processed stream and subject the processed stream to hydrodynamic cavitation to reduce the pour point, reduce the cloud point, reduce the cold filter plugging point, or a combination thereof of the portion of the processed stream, and wherein the portion of the processed stream fed to the cavitation unit is collected from the distributor tray.

* * * * *